(No Model.)
C. T. & A. DE GRAFFENRIED.
NUT LOCK.
No. 573,397. Patented Dec. 15, 1896.
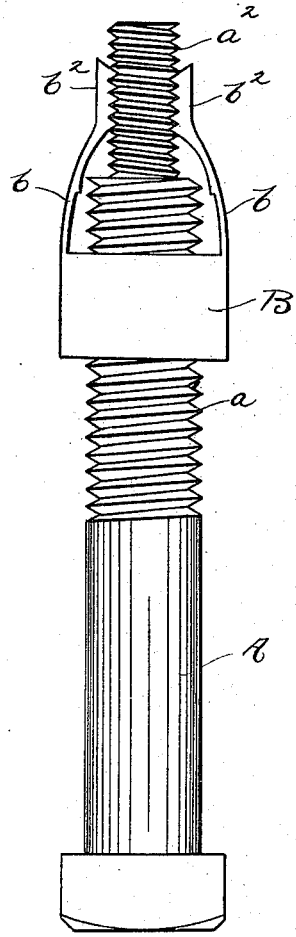
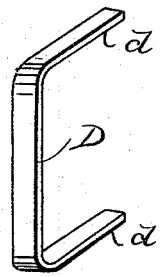
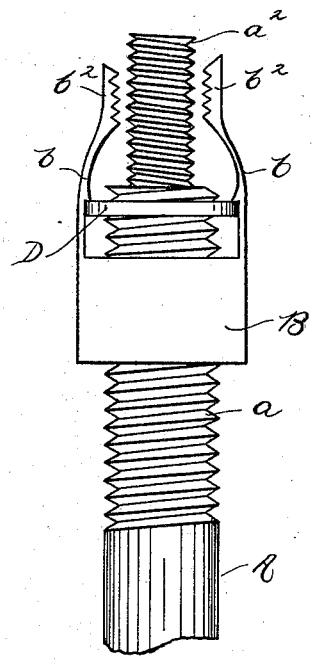
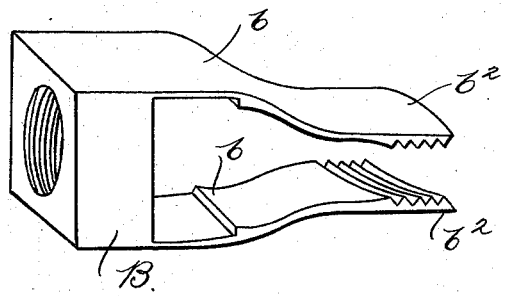
WITNESSES:
INVENTOR
Charles T. De Graffenried
Allen De Graffenried
BY Edgar Tate
ATTORNEYS

UNITED STATES PATENT OFFICE.

CHARLES THORNBURG DE GRAFFENRIED AND ALLEN DE GRAFFENRIED, OF SAVANNAH, GEORGIA.

NUT-LOCK.

SPECIFICATION forming part of Letters Patent No. 573,397, dated December 15, 1896.

Application filed March 31, 1896. Serial No. 585,591. (No model.)

*To all whom it may concern:*

Be it known that we, CHARLES THORNBURG DE GRAFFENRIED and ALLEN DE GRAFFENRIED, citizens of the United States, and residents of Savannah, in the county of Chatham and State of Georgia, have invented certain new and useful Improvements in Nut-Locks, of which the following is a specification, reference being had to the accompanying drawings, forming a part thereof, in which similar letters of reference indicate corresponding parts.

This invention relates to nut-locks, and the object thereof is to provide an effective device of this class which is simple in construction and operation, and which is adapted to be connected with or applied to the ends of a bolt, rod, or bar wherever such devices are necessary or required.

The invention is fully disclosed in the following specification, of which the accompanying drawings form a part, in which—

Figure 1 is a side view of a bolt, rod, or bar provided with our improved nut and nut-lock; Fig. 2, a perspective view of the nut and nut-lock which forms a part therof; Fig. 3, a perspective view of a device which we employ in connecting the nut with the bolt, rod, or bar; and Fig. 4 is a side view similar to Fig. 1, showing the method of connecting the nut with the bolt, rod, or bar.

In the drawings forming part of this specification, A represents an ordinary bolt, rod, or bar of any desired shape or form, and which may be used for any desired purpose, and said bolt is provided with a screw-threaded end, as shown at $a$, and with a screw-threaded extension which is shown at $a^2$, and the screw-thread on the bolt A is the reverse of that on the extension $a^2$, one being a right and the other being a left thread, and in the practice or our invention we provide a nut B, which is provided with a screw-threaded central bore and is adapted to be mounted on the rod or bolt A, and said nut is provided at its opposite sides with strong spring-arms $b$, the ends of which are inwardly curved and provided with segmental jaws $b^2$, which are screw-threaded on their inner sides, the screw-threads formed on said jaws being adapted to engage with those on the extension $a^2$. We also provide a yoke D, having side arms $d$, which are adapted to be forced between the arms $b$ of the nut when connecting the same with the rod or bolt A, as shown in Fig. 4, in order that the jaws $b^2$ on said arms may be held out of engagement with the extension $a^2$ of said rod or bolt, and the operation will be readily understood from the foregoing description when taken in connection with the accompanying drawings and the following statement thereof.

Whenever it is desired to connect the nut with the rod or bolt A, the yoke D is applied to or inserted between the arms $b$, as shown in Fig. 4, and said nut is then screwed into position, after which the yoke D is removed and the arms $b$ allowed to spring in, so that the jaws $b^2$ will engage with the screw-threaded extension $a^2$, and by reason of the fact that the thread on said extension and on the jaws $b^2$ is the reverse of that on the rod or bolt it will be apparent that the nut B will be securely held and cannot come off or work off under any circumstances.

This device is simple in construction and operation and perfectly adapted to accomplish the result for which it is intended, and it is also comparatively inexpensive, and it is evident that changes in and modifications of the construction herein described may be made without departing from the spirit of my invention or sacrificing its advantages, and we reserve the right to make all such alterations therein and modifications thereof as fairly come within the scope of the invention.

Having fully described our invention, we claim as new and desire to secure by Letters Patent—

1. A nut provided with spring-arms the free ends of which are inwardly directed and provided with segmental jaws which are screw-threaded on their inner surfaces the screw-thread on the inner surfaces of the jaws being the reverse of that within the nut, substantially as shown and described.

2. The combination with a rod or bolt, provided with a screw-threaded end, and an extension which is also screw-threaded, the screw-thread on the extension being the reverse of that on the rod or bolt, of a nut which is adapted to be mounted on said bolt, and provided with spring-arms, the free ends of which are contracted and provided with segmental jaws, which are also screw-threaded on their inner surfaces, the screw-thread on the jaws being the same as that on the extension of the rod or bolt, substantially as shown and described.

In testimony that we claim the foregoing as our invention we have signed our names, in presence of the subscribing witnesses, this 23d day of March, 1896.

CHARLES THORNBURG DE GRAFFENRIED.
ALLEN DE GRAFFENRIED.

Witnesses:
B. R. WEVER,
J. R. METZGER.